(12) United States Patent
Kozhaya et al.

(10) Patent No.: US 11,178,010 B2
(45) Date of Patent: Nov. 16, 2021

(54) PERSONALIZED MACHINE LEARNING MODEL MANAGEMENT AND DEPLOYMENT ON EDGE DEVICES

(71) Applicant: International Business Machines Corporation, Armonk, NY (US)

(72) Inventors: Joseph Kozhaya, Morrisville, NC (US); Ryan Anderson, Kensington, CA (US); Shikhar Kwatra, Durham, NC (US); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/800,464

(22) Filed: Feb. 25, 2020

(65) Prior Publication Data

US 2021/0266225 A1    Aug. 26, 2021

(51) Int. Cl.
*H04L 12/24* (2006.01)
*G06N 20/00* (2019.01)
*G06N 5/04* (2006.01)

(52) U.S. Cl.
CPC ......... *H04L 41/0886* (2013.01); *G06N 5/04* (2013.01); *G06N 20/00* (2019.01); *H04L 41/0816* (2013.01); *H04L 41/147* (2013.01); *H04L 41/16* (2013.01)

(58) Field of Classification Search
CPC ... H04L 41/16; H04L 41/147; H04L 41/0816; H04L 41/0886; G06N 20/00; G06N 5/04
See application file for complete search history.

(56) References Cited

U.S. PATENT DOCUMENTS

| | | |
|---|---|---|
| 6,493,686 B1 | 12/2002 | Francone |
| 7,237,189 B2 | 6/2007 | Michael |
| 8,560,371 B2 | 10/2013 | Levitt |
| 10,380,488 B2 | 8/2019 | Mathew |
| 10,902,705 B1* | 1/2021 | Rose ................... H04W 12/72 |
| 2016/0148115 A1 | 5/2016 | Sirosh |
| 2016/0358098 A1 | 12/2016 | Duesterwald |
| 2018/0144265 A1 | 5/2018 | Bonawitz |

(Continued)

OTHER PUBLICATIONS

Kaul, Aditya, "Huawei Is Pushing for AI Training at the Edge", Tractica.com, Nov. 11, 2018, 4 pages, <https://www.tractica.com/artificial-intelligence/huawei-is-pushing-for-ai-training-at-the-edge/>.

(Continued)

*Primary Examiner* — Azizul Choudhury
(74) *Attorney, Agent, or Firm* — Edward Li

(57) ABSTRACT

A computer-implemented method, a computer program product, and a computer system for personalized machine learning model management and deployment on edge devices. An edge server monitors activities performed on respective ones of edge devices. The edge server associates machine learning models in a model set with respective ones of the activities. The edge server predicts a next set of activities that are to be performed on the respective ones of the edge devices. The edge server deploys, on the respective ones of edge devices, machine learning models that are associated with the next set of the activities. Applications on the respective ones of the devices, which execute the next set of the activities, leverage the machine learning models that are associated with the next set of the activities.

15 Claims, 6 Drawing Sheets

(56) References Cited

U.S. PATENT DOCUMENTS

| | | |
|---|---|---|
| 2019/0156246 A1 | 5/2019 | Kuo |
| 2019/0319868 A1* | 10/2019 | Svennebring ......... H04L 41/147 |
| 2020/0151619 A1* | 5/2020 | Mopur ................... G06N 20/00 |
| 2020/0159203 A1* | 5/2020 | Shetty B ............. G05B 23/0289 |
| 2020/0167202 A1* | 5/2020 | Huang ................... G06N 20/10 |
| 2020/0196210 A1* | 6/2020 | Kanitkar ............... H04W 36/12 |
| 2020/0344297 A1* | 10/2020 | Agarwal ............. H04L 67/2842 |

OTHER PUBLICATIONS

Mell et al., "The NIST Definition of Cloud Computing", National Institute of Standards and Technology, Special Publication 800-145, Sep. 2011, 7 pages.

Mevorah, Mark, "Machine Learning at the Edge: Using and Retraining Image Classification Models with AWS IoT Greengrass (Part 2)", The Internet of Things on AWS—Official Blog, Dec. 12, 2018, 8 pages, <https://aws.amazon.com/blogs/iot/machine-learning-at-the-edge-using-and-retraining-image-classification-models-with-aws-iot-greengrass-part-2/>.

Wu, et al., "Machine Learning at Facebook: Understanding Inference at the Edge", Facebook, Inc. ,Printed Dec. 26, 2019, 15 pages, <https://research.fb.com/wp-content/uploads/2018/12/Machine-Learning-at-Facebook-Understanding-Inference-at-the-Edge.pdf>.

* cited by examiner

PERSONALIZED MACHINE LEARNING MODEL MANAGEMENT AND DEPLOYMENT ON EDGE DEVICES

BACKGROUND

The present invention relates generally to machine learning in an edge computing environment, and more particularly to personalized machine learning model management and deployment on edge devices.

There is a burgeoning demand for solutions to deploying machine learning models to edge devices and training custom models on edge devices. Multiple techniques are being developed for training edge devices as there is growth in edge computing. However, training edge devices and deployment of models on edge devices are manual driven; furthermore, in determining which machine learning model needs to be deployed to meet demands of the users, the ingestion of personalized heuristics of a user is not taken into account.

SUMMARY

In one aspect, a computer-implemented method for personalized machine learning model management and deployment on edge devices is provided. The computer-implemented method includes monitoring, by an edge server, activities performed on respective ones of edge devices. The computer-implemented method further includes associating, by the edge server, machine learning models in a model set with respective ones of the activities. The computer-implemented method further includes predicting, by the edge server, a next set of activities that are to be performed on the respective ones of the edge devices. The computer-implemented method further includes deploying, by the edge server, on the respective ones of edge devices, machine learning models that are associated with the next set of the activities. Applications on the respective ones of the devices, which execute the next set of the activities, leverage the machine learning models that are associated with the next set of the activities.

In another aspect, a computer program product for personalized machine learning model management and deployment on edge devices is provided. The computer program product comprises a computer readable storage medium having program instructions embodied therewith, and the program instructions are executable by one or more processors. The program instructions are executable to: monitor, by an edge server, activities performed on respective ones of edge devices; associate, by the edge server, machine learning models in a model set with respective ones of the activities; predict, by the edge server, a next set of activities that are to be performed on the respective ones of the edge devices; and deploy, by the edge server, on the respective ones of edge devices, machine learning models that are associated with the next set of the activities. Applications on the respective ones of the devices, which execute the next set of the activities, leverage the machine learning models that are associated with the next set of the activities.

In yet another aspect, a computer system for personalized machine learning model management and deployment on edge devices is provided. The computer system comprises one or more processors, one or more computer readable tangible storage devices, and program instructions stored on at least one of the one or more computer readable tangible storage devices for execution by at least one of the one or more processors. The program instructions are executable to monitor, by an edge server, activities performed on respective ones of edge devices. The program instructions are further executable to associate, by the edge server, machine learning models in a model set with respective ones of the activities. The program instructions are further executable to predict, by the edge server, a next set of activities that are to be performed on the respective ones of the edge devices. The program instructions are further executable to deploy, by the edge server, on the respective ones of edge devices, machine learning models that are associated with the next set of the activities. Applications on the respective ones of the devices, which execute the next set of the activities, leverage the machine learning models that are associated with the next set of the activities.

DETAILED DESCRIPTION

Embodiments of the present invention disclose an approach to solving a problem of automated deployment and self-destruction of machine learning models on edge devices, based on user's needs. In the embodiments of the present invention, machine learning on edge devices is used to derive types of machine learning models to be deployed in a particular configuration including but not limited to time frames, situation types, participants, and other dynamics of situations, based on the context extracted from user activities. The disclosed approach maintains a minimum footprint but provide maximum flexibility or agility of different machine learning models on the edge devices. Using the disclosed approach, the most relevant models are selected based on user's heuristics and needs.

The machine learning models are managed in an edge computing environment, such that right machine learning models, driven by user/device contexts and historical patterns, are deployed, and previously deployed models are destroyed or discarded to leverage the limited edge device resources most efficiently.

The disclosed approach in the present invention has following advantages. (1) The approach outlines a solution for deploying right machine learning models on edge devices which are best suited to assist users in performing their next activities. (2) The approach enables continually machine learning by capturing users' activities and responses to optimize deploying the correct machine learning models on edge devices. (3) The approach optimizes machine learning model deployment at granularity of user specific edge device properties, such as a device type, an operating system, network connectivity, and a location. This advantage allows for creating machine learning models that are unique and specific to the user specific edge device. (4) The approach preserves end user privacy by avoiding transferring any user specific data to the cloud and rather only communication response metadata while keeping the user data safe on edge devices.

Figure 1:
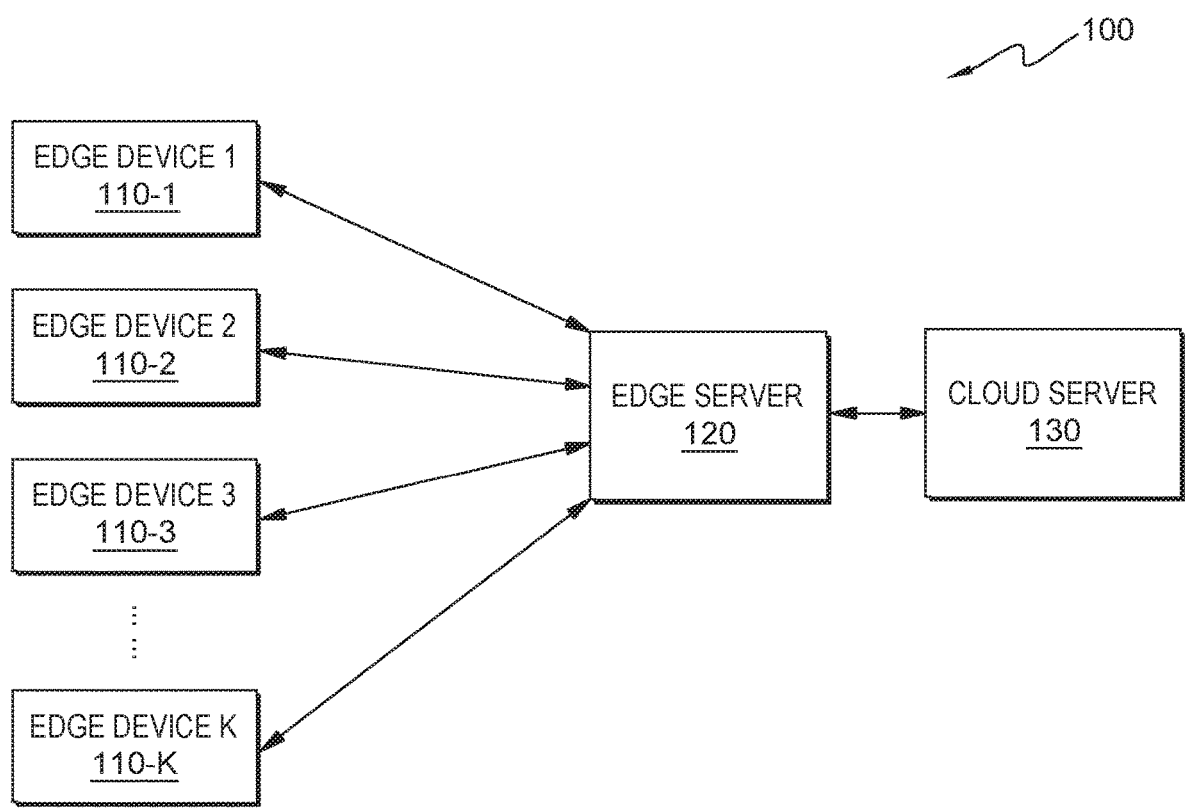
FIG. 1 is a diagram showing an edge computing environment for personalized machine learning model management and deployment on edge devices, in accordance with one embodiment of the present invention.

FIG. 1 is a diagram showing an edge computing environment 100 for personalized machine learning model management and deployment on edge devices, in accordance with one embodiment of the present invention. FIG. 1 provides only an illustration of one implementation and does not imply any limitations with regard to an edge computing environment in which different embodiments may be implemented.

The edge computing takes advantage of compute available outside of traditional and cloud data centers to place workload closer to where data is created, and actions are taken in response to analysis of that data. By harnessing and managing the compute available on remote premises such as factories, retail stores, warehouses, hotels, distribution centers, on vehicles, etc., applications can be created that substantially reduce latencies, lower demands on network bandwidth, increase privacy of sensitive information, and enable operations even when networks are disrupted.

As shown in FIG. 1, the edge computing environment 100 comprises one or more edge devices, namely edge device 1 (110-1), edge device 2 (110-2), edge device 3 (110-3), . . . , and edge device K (110-K). Each of the edge devices is a special-purpose piece of equipment, such as an assembly machine on a factory floor, an ATM, an intelligent camera, or an automobile, to name a few examples. Each of the edge devices also has compute capacity integrated into that edge device on which interesting work can be performed.

The edge computing environment 100 further comprises an edge server 120. The edge server 120 is a computer device located in a remote operations facility, such as a factory, retail store, hotel, distribution center, or bank, for example. The personalized machine learning model management and deployment on edge devices (110-1 through 110-K) are implemented on the edge server 120. The computer device hosting the edge server 120 is described in more detail in later paragraphs with reference to FIG. 4.

The edge computing environment 100 further comprises a cloud server 130. The cloud computing environment is described in later paragraphs with reference to FIG. 5 and FIG. 6.

Assume that a set of machine learning models have been trained and optimized for various activities or objectives. A set of N machine learning models ($S_{ML}$) is expressed as follows.

$$S_{ML}=\{ML_1, ML_2, ML_3, \ldots, ML_N\}$$

The set $S_{ML}$ includes N machine learning models, namely $ML_1$, $ML_2$, $ML_3$, . . . , and $ML_N$. $ML_1$, $ML_2$, $ML_3$, . . . , and $ML_N$ are trained for respective ones of activities. For example, the i-th machine learning model ($ML_i$) is trained for object detection in images, the j-th machine learning model ($ML_j$) is trained for image classification in an urban area, and k-th machine learning model ($ML_k$) is trained for image classification in a rural area. In another example, the set of N machine learning models ($S_{ML}$) may include machine learning models for detecting emotions from images and sentiment from text or a variety of different natural language processing tasks.

Figure 2:
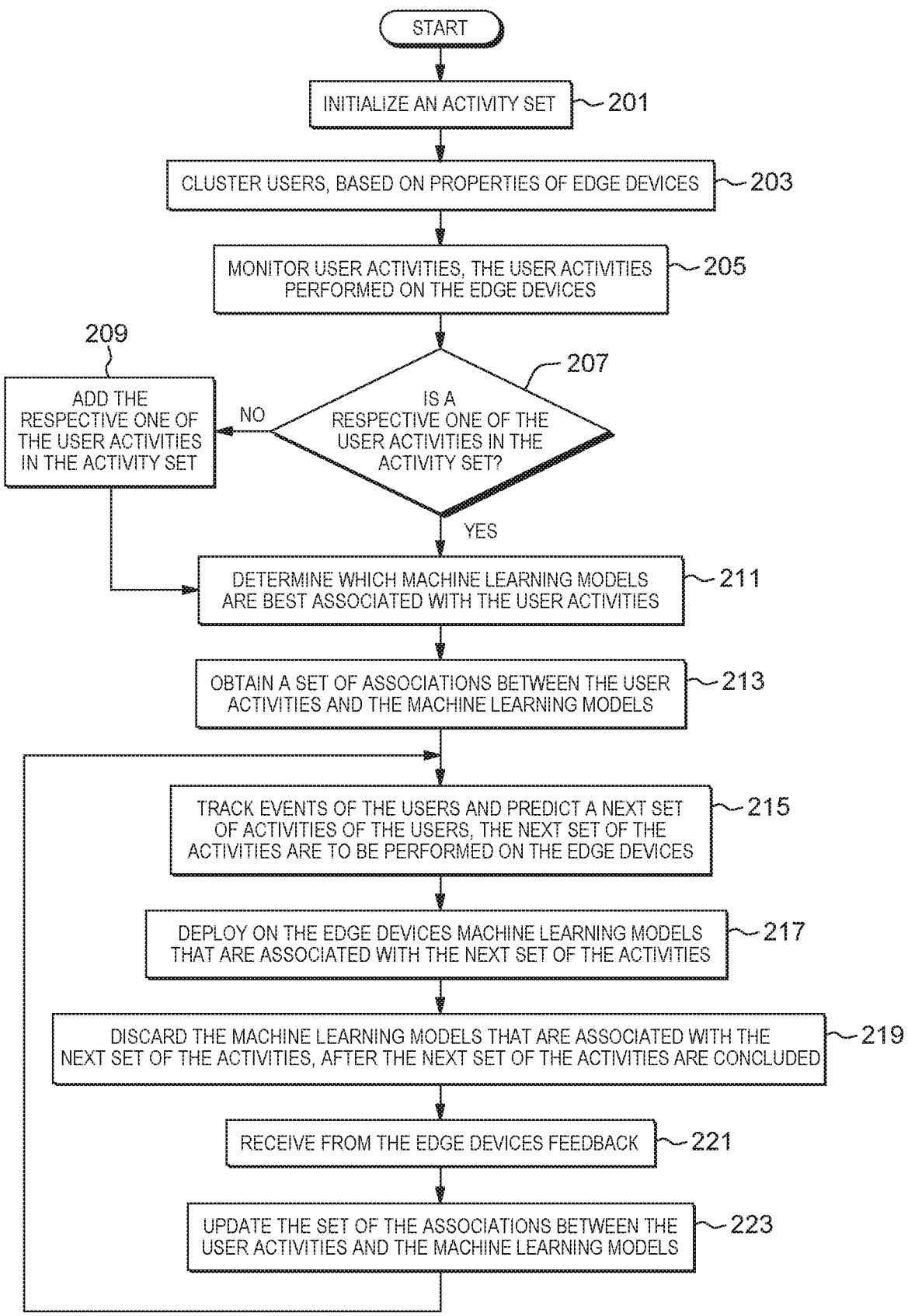
FIG. 2 is a flowchart showing operational steps for personalized machine learning model management and deployment on edge devices, in accordance with one embodiment of the present invention.

FIG. 2 is a flowchart showing operational steps for personalized machine learning model management and deployment on edge devices, in accordance with one embodiment of the present invention. At step 201, an edge server (for example, the edge server 120 shown in FIG. 1) initiates an activity set ($S_{activity}$) to be an empty set of activities that users can make use their edge devices (for example, the edge devices 110-1 through 110-K shown in FIG. 1). Note that the activities may be associated with the edge devices directly and they don't need to be user specific.

At step 203, the edge server clusters or groups the users, based on properties of respective ones of the edge devices. For example, the properties including device types, network connectivity, and locations are used to create user clusters. At this step, M user clusters are obtained:

$$C_{list}=\{C_1, C_2, \ldots, C_M\}$$

At step 205, the edge server monitors or ingests user activities of each user in respective ones of the user clusters. The user activities include both digital activities and physical activities performed on the respective ones of the edge devices. For example, a user activity may include a user using their phone to book a reservation, order a car, get navigation help, do online shopping, or explore things-to-do.

For each of the user activities, the edge server at step 207 determines whether a respective one of the user activities, $a_i$, is in the activity set $S_{activity}$. In response to determining that the $a_i$ is not in the activity set $S_{activity}$ (NO branch of decision step 207), the edge server at step 209 adds $a_i$ in the activity set $S_{activity}$.

In response to determining that the $a_i$ is in the activity set $S_{activity}$ (YES branch of decision step 207), at step 211, the edge server evaluates relevant machine learning models in the set $S_{ML}$ and determines which machine learning models are best associated with respective ones of relevant user activities. The relevant machine learning models are those machine learning models accessible by the edge devices or available to the edged devices. Different approaches may be used to determines which machine learning models can be best associated with the respective ones of the user activities. In the first approach, the edge server passes data associated with the respective ones of the user activities to relevant machine learning models in the set $S_{ML}$ and evaluates responses or feedback from the users of the respective ones of the edge devices. For example, an image classification activity is sent to one or more image classification models; the responses are evaluated based on confidence of the responses (how well one or more image classification models perform against the data) and/or based on user's feedback (user's experience satisfaction). In the second approach, the edge server applies a reinforcement learning solution where the state is captured by parameters of activities and actions are defined by the output responses of the different machine learning models. The reward or penalty is defined by capturing the responses. Over time, the reinforcement learning solution learns about which machine learning models are best associated with which user activities to maximize user experience.

At a conclusion of step 213, the edge server obtains a set of strong associations between the user activities and respective ones of the relevant machine learning models. One user activity ($a_i$) may be associated with multiple machine learning models at different strength. As mentioned previously, the user activities are performed on respective ones of the edge devices and the relevant machine learning models are accessible by the edge devices or available to the edged devices.

The relevant machine learning models may initially not be available on the edge devices and thus the evaluation of the relevant machine learning models may be executed by applying such models via a cloud computing environment (for example, the cloud server 130 shown in FIG. 1). The relevant machine learning models being in the cloud may be fine in a learning phase; however, the models will eventually be deployed on the edge devices for requirements of being able to execute the models on the edge devices for concerns of latency. Alternatively, the edge server may deploy different subsets of the relevant machine learning models to respective ones of the edge devices and capture responses from the respective ones of the edge devices. Only response metadata such as confidence scores is captured. Then, by comparing the response metadata from the respective ones of the edge devices performing similar activities, the edge server determines the associations between the user activities and the respective ones of the relevant machine learning models.

Figure 3:
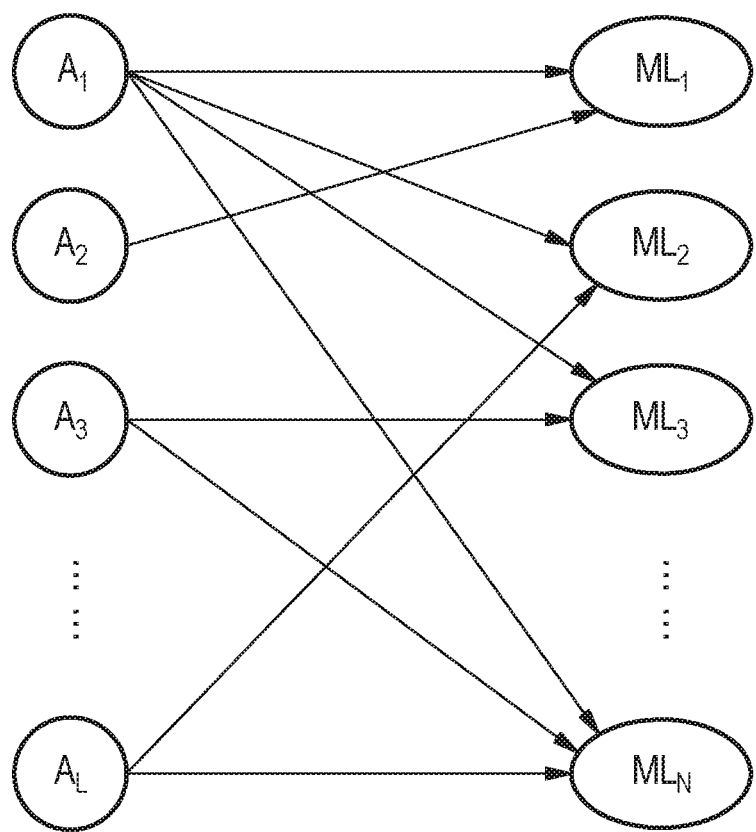
FIG. 3 is a diagram showing associations between user activities and machine learning models, in accordance with one embodiment of the present invention.

FIG. 3 is a diagram showing an example of the associations between the user activities and the machine learning models, in accordance with one embodiment of the present invention. In the example shown in FIG. 3, activity 1 ($a_1$) is associated with machine learning model 1 ($ML_1$), machine learning model 2 ($ML_2$), machine learning model 3 ($ML_3$), and machine learning model N ($ML_N$); activity 2 ($a_2$) is only associated with machine learning model 1 ($ML_1$); activity 3 ($a_3$) is associated with machine learning model 3 ($ML_3$) and machine learning model N ($ML_N$); activity L ($a_L$) is associated with machine learning model 2 ($ML_2$) and machine learning model N ($ML_N$).

Referring back to FIG. 2, at step 215, the edge server tracks events of the respective users and determines a next set of activities of the respective users. Through the edge devices, the edge server tracks the events. The edged devices monitors the events and communicates data of the events to the edge server. The next set of activities of the respective users are to be performed on the respective edge devices. For example, the next set of activities of the respective users is determined by capturing user actions, calendars, locations, social media interactions, and messaging.

After the next set of the activities is predicted at step 215, the edge server at step 217 deploys, on the respective edge devices, machine learning models that are associated with the next set of activities of the respective users. Therefore, applications on the edge devices leveraging the machine learning models execute the next set of activities in an optimal manner. The machine learning models are downloaded from a cloud server (for example, the cloud server 130 shown in FIG. 3). At step 219, the edge devices discards the machine learning models that are associated with the next set of the activities, after the next set of the activities are concluded.

Further, the edge devices captures user feedback on the machine learning models that are associated with the next set of the activities. The users provides with their satisfaction or frustration about how the machine learning models satisfy the next set of activities. The edge devices sends the feedback to the edge server. At step 221, the edge server receives from the edge devices the feedback.

Upon receiving the feedback from the edge devices, the edge server at step 223 updates the set of the associations between the user activities and the respective ones of the relevant machine learning models. The set of the associations has been obtained at step 213. After updating the set of the associations between the user activities and the respective ones of the relevant machine learning models, the edge server reiterates step 215.

Three examples of the present invention are described as follows. In a first example, there are architectures and model deployments that require a degree of understanding about the regulatory constraints under which the edge devices operate. For deploying vision or speech models on edge devices operating in jurisdictions like the European Union and Germany that have different regulatory requirements from America and the rest of the world, the architecture and the deployment of the technology must take these regulations and policies into account. In this example, an image recognition model, which is capable of recognizing the presence of humans anonymously or recognizing specific humans, has constraints about how much data can be gathered and where that data can be stored. In this example of personalizing machine learning models deployment and management in the edge computing environment, the understanding of the regulations and policies is taken into account, and machine learning models and supporting technology running on the edge devices must be compliant with the regulatory necessities.

Another example is related to the variability of light coming through a restaurant window for an internal environment or external lighting conditions that vary with the sun's position of the time of day. Changing light creates different conditions under which an image recognition model operates. Certain machine learning models have multiple factors that are to be scored, and a perfect balance or blend of signals is a factor in determining which machine learning model is the best one to run at times of days and at different locations and latitudes. As the time of day progresses, in any deployment of an outdoor vision model, the system needs to adapt, adjust, and refine the nature of which optimal model is deployed at the edge devices so the inference engine may vary for different cameras at a same location or similarly configured cameras at different locations. In all cases, the system has the ability to make adjustments to which models are deployed under varying circumstances and to try to find the ideal model deployments.

A third example is related to assets which are operating independently of individual users. For example, a fleet vehicle or an oil/gas turbine operating in a plant over decades. Considering a digital twin of the turbine operating in the plant, the device ages and evolves over time. Applications for the device may change for the stakeholders and key performance indicators (KPIs) may differ over time and across stakeholders. A flexible and adaptive system determines the best signal and the best models to satisfy the various stakeholders and their needs over a multidecade time line with multiple stakeholders who will leverage the system. For example, a model trained with data of mid-life device may perform better on devices which have been in operation for a while, while a model trained on data of a relatively new device performs better for devices recently deployed. The model trained on data from mid-life devices may be better tuned and handle parameters such as noise due to aging devices. The disclosed approach in the present invention outlines the ability of the system to automatically identify and deploy the optimal model overtime where the device is re-purposed for a different need. For example, the machine learning models for predictive maintenance can vary significantly depending on the workload being applied by the edge devices and thus it is important to have a method that can deploy the right machine learning model for accurate detection and prevention.

Note that, while the invention described above in the embodiments include user activities, the invention supports scenarios where the activities do not explicitly involve a user or users. For example, a camera at a restaurant can deploy a specific machine learning model in the morning to detect user's sentiment and another model at night to predict likelihood of vandalism.

Figure 4:
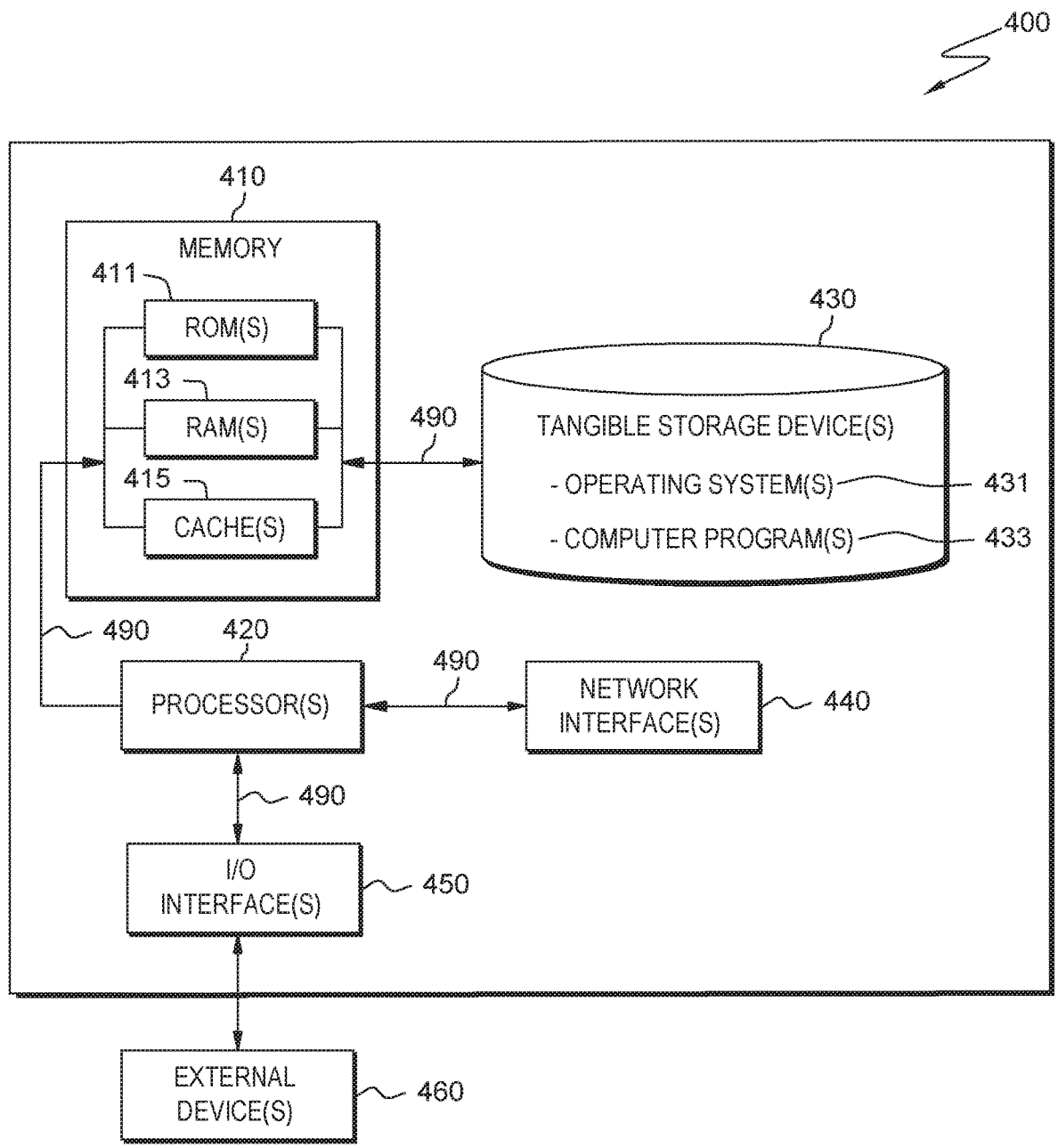
FIG. 4 is a diagram illustrating components of a computer device, in accordance with one embodiment of the present invention.

FIG. 4 is a diagram illustrating components of computer device 400, in accordance with one embodiment of the present invention. It should be appreciated that FIG. 4 provides only an illustration of one implementation and does not imply any limitations with regard to the environment in which different embodiments may be implemented.

Referring to FIG. 4, computer device 400 includes processor(s) 420, memory 410, and tangible storage device(s) 430. In FIG. 4, communications among the above-mentioned components of computer device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computer device 400 further includes I/O interface(s) 450. I/O interface(s) 450 allows for input and output of data with external device(s) 460 that may be connected to computer device 400. Computer device 400 further includes network interface(s) 440 for communications between computer device 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
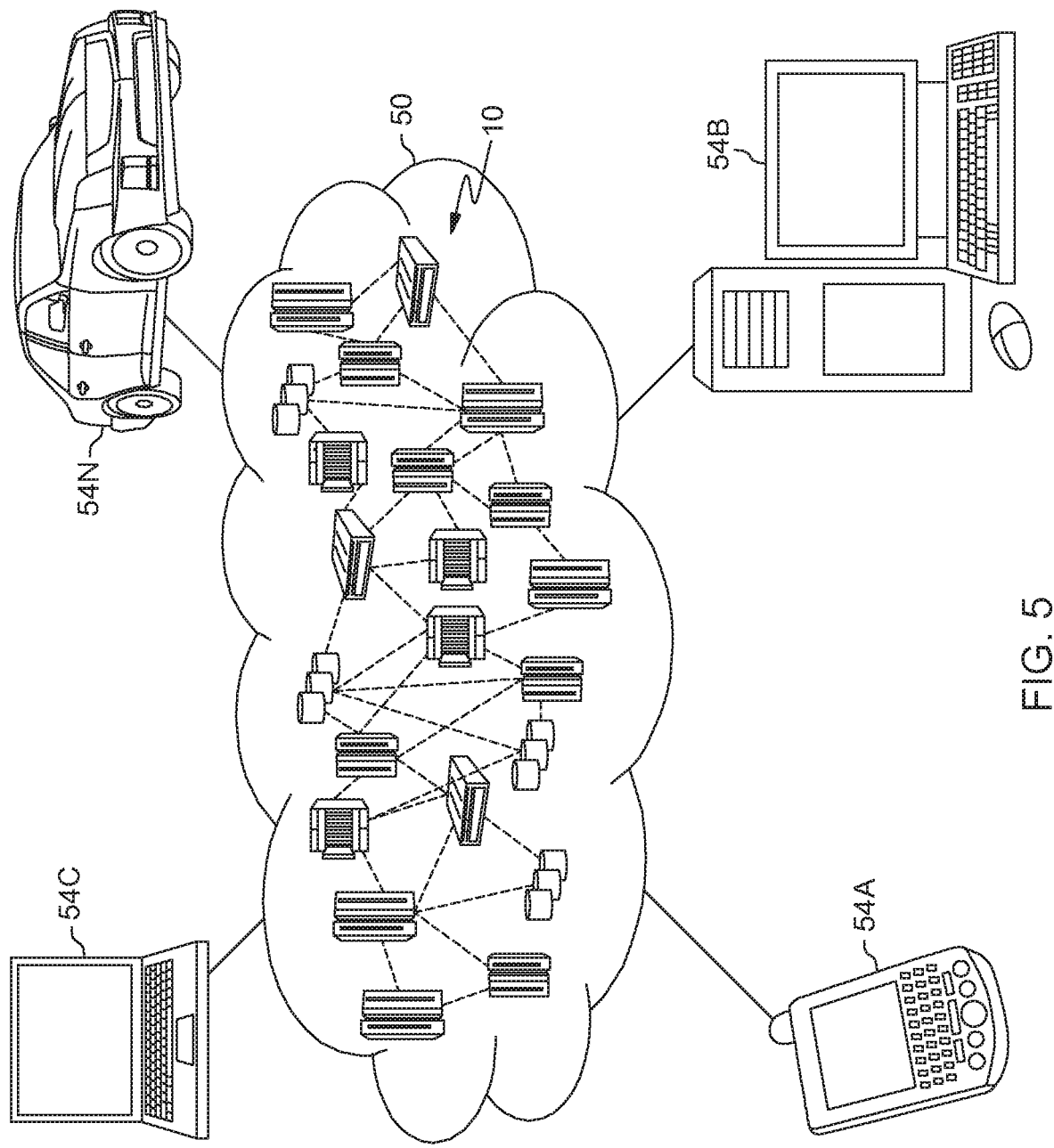
FIG. 5 depicts a cloud computing environment, in accordance with one embodiment of the present invention.
Figure 6:
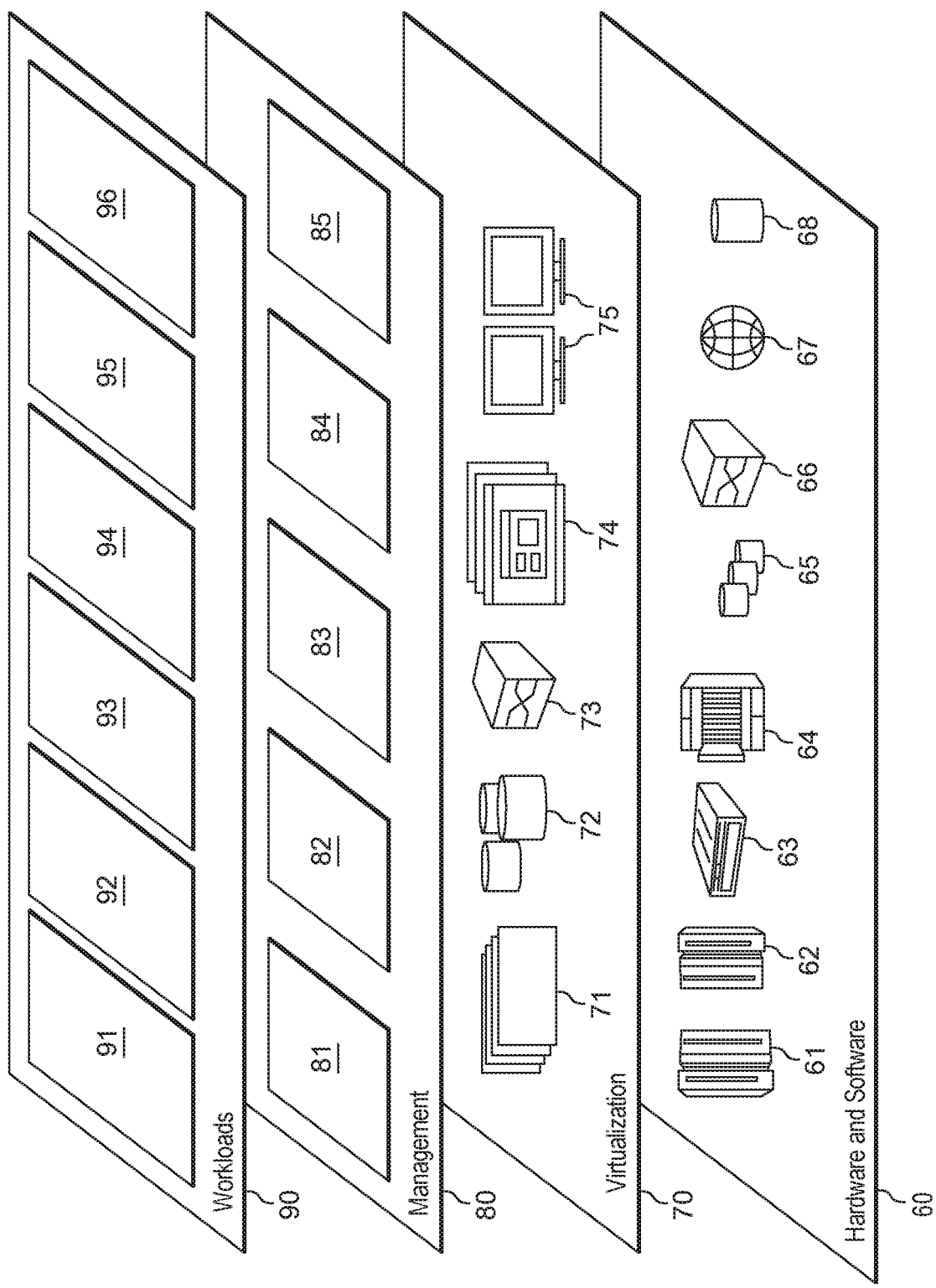
FIG. 6 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of personalized machine learning model management and deployment on edge devices.

What is claimed is:

1. A computer-implemented method for personalized machine learning model management and deployment on edge devices, the method comprising:
    monitoring, by an edge server, activities performed on respective ones of edge devices;
    associating, by the edge server, machine learning models in a model set with respective ones of the activities;
    receiving, by the edge server, data associated with the activities, wherein the data associated with the activities is passed to the machine learning models in the model set by the respective ones of the edge devices, wherein the machine learning models in the model set are stored on a cloud server;
    evaluating, by the edge server, the machine learning models in the model set, by evaluating at least one of: confidence of responses and feedback from users of the respective ones of the edge devices;
    determining, by the edge server, which machine learning models are best associated with the respective ones of the activities;
    predicting, by the edge server, a next set of activities that are to be performed on the respective ones of the edge devices;
    deploying, by the edge server, on the respective ones of edge devices, machine learning models that are associated with the next set of the activities; and
    wherein applications on the respective ones of the devices, executing the next set of the activities, leverage the machine learning models that are associated with the next set of the activities.

2. The computer-implemented method of claim 1, further comprising:
    receiving, by the edge server, from users of the respective ones of the edge devices, feedback on satisfaction with the application and the machine learning models that are associated with the next set of the activities, after the next set of the activities are concluded on the respective ones of the edge devices; and
    updating, by the edge server, associations between the machine learning models in the model set with respective ones of the activities.

3. The computer-implemented method of claim 1, further comprising:
    discarding, by the edge devices, the machine learning models that are associated with the next set of the activities, after the next set of the activities are concluded on the respective ones of the edge devices.

4. The computer-implemented method of claim 1, further comprising:
    deploying, by the edge server, on the respective ones of edge devices, subsets of the machine learning models in the model set;
    passing, by the respective ones of the edge devices, data associated with the activities to the machine learning models in the model set; and
    evaluating, by the edge server, at least one of: confidence of responses and feedback from users of the respective ones of the edge devices.

5. The computer-implemented method of claim 1, wherein the edge server determines the next set of the activities by capturing at least one of user actions, calendars, locations, social media interactions, and messaging.

6. A computer program product for personalized machine learning model management and deployment on edge devices, the computer program product comprising a computer readable storage medium having program instructions embodied therewith, the program instructions executable by one or more processors, the program instructions executable to:
    monitor, by an edge server, activities performed on respective ones of edge devices;

associate, by the edge server, machine learning models in a model set with respective ones of the activities;

receive, by the edge server, data associated with the activities, wherein the data associated with the activities is passed to the machine learning models in the model set by the respective ones of the edge devices, wherein the machine learning models in the model set are stored on a cloud server;

evaluate, by the edge server, the machine learning models in the model set, by evaluating at least one of: confidence of responses and feedback from users of the respective ones of the edge devices;

determine, by the edge server, which machine learning models are best associated with the respective ones of the activities;

predict, by the edge server, a next set of activities that are to be performed on the respective ones of the edge devices;

deploy, by the edge server, on the respective ones of edge devices, machine learning models that are associated with the next set of the activities; and wherein applications on the respective ones of the devices, executing the next set of the activities, leverage the machine learning models that are associated with the next set of the activities.

7. The computer program product of claim 6, further comprising the program instructions executable to:

receive, by the edge server, from users of the respective ones of the edge devices, feedback on satisfaction with the applications and the machine learning models that are associated with the next set of the activities, after the next set of the activities are concluded on the respective ones of the edge devices; and update, by the edge server, associations between the machine learning models in the model set with respective ones of the activities.

8. The computer program product of claim 6, further comprising the program instructions executable to:

discard, by the edge devices, the machine learning models that are associated with the next set of the activities, after the next set of the activities are concluded on the respective ones of the edge devices.

9. The computer program product of claim 6, further comprising program instructions executable to:

deploy, by the edge server, on the respective ones of edge devices, subsets of the machine learning models in the model set;

pass, by the respective ones of the edge devices, data associated with the activities to the machine learning models in the model set; and evaluate, by the edge server, at least one of: confidence of responses and feedback from users of the respective ones of the edge devices.

10. The computer program product of claim 6, wherein the edge server determines the next set of the activities by capturing at least one of user actions, calendars, locations, social media interactions, and messaging.

11. A computer system for personalized machine learning model management and deployment on edge devices, the computer system comprising:

one or more processors, one or more computer readable tangible storage devices, and program instructions stored on at least one of the one or more computer readable tangible storage devices for execution by at least one of the one or more processors, the program instructions executable to:

monitor, by an edge server, activities performed on respective ones of edge devices;

associate, by the edge server, machine learning models in a model set with respective ones of the activities;

receive, by the edge server, data associated with the activities, wherein the data associated with the activities is passed to the machine learning models in the model set by the respective ones of the edge devices, wherein the machine learning models in the model set are stored on a cloud server;

evaluate, by the edge server, the machine learning models in the model set, by evaluating at least one of: confidence of responses and feedback from users of the respective ones of the edge devices;

determine, by the edge server, which machine learning models are best associated with the respective ones of the activities;

predict, by the edge server, a next set of activities that are to be performed on the respective ones of the edge devices;

deploy, by the edge server, on the respective ones of edge devices, machine learning models that are associated with the next set of the activities; and wherein applications on the respective ones of the devices, executing the next set of the activities, leverage the machine learning models that are associated with the next set of the activities.

12. The computer system of claim 11, further comprising the program instructions executable to:

receive, by the edge server, from users of the respective ones of the edge devices, feedback on satisfaction with the applications and the machine learning models that are associated with the next set of the activities, after the next set of the activities are concluded on the respective ones of the edge devices; and update, by the edge server, associations between the machine learning models in the model set with respective ones of the activities.

13. The computer system of claim 11, further comprising the program instructions executable to:

discard, by the edge devices, the machine learning models that are associated with the next set of the activities, after the next set of the activities are concluded on the respective ones of the edge devices.

14. The computer system of claim 11, further comprising program instructions executable to:

deploy, by the edge server, on the respective ones of edge devices, subsets of the machine learning models in the model set;

pass, by the respective ones of the edge devices, data associated with the activities to the machine learning models in the model set; and evaluate, by the edge server, at least one of: confidence of responses and feedback from users of the respective ones of the edge devices.

15. The computer system of claim 11, wherein the edge server determines the next set of the activities by capturing at least one of user actions, calendars, locations, social media interactions, and messaging.

* * * * *